US009462001B2

(12) United States Patent
Willhite et al.

(10) Patent No.: US 9,462,001 B2
(45) Date of Patent: Oct. 4, 2016

(54) COMPUTER NETWORK ACCESS CONTROL (71) Applicant: Cisco Technology, Inc., San Jose, CA (US)

(72) Inventors: Gary Michael Willhite, Land O Lakes, FL (US); Lauren Suzanne Lomanto, Tucson, AZ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/156,159

(22) Filed: Jan. 15, 2014

(65) Prior Publication Data
US 2015/0200949 A1 Jul. 16, 2015

(51) Int. Cl.
H04L 29/00 (2006.01)
H04L 29/06 (2006.01)

(52) U.S. Cl.
CPC ......... H04L 63/101 (2013.01); H04L 63/0227 (2013.01); H04L 63/1458 (2013.01)

(58) Field of Classification Search
CPC ... H04L 63/10; H04L 9/3268; H04L 9/3273; H04L 63/08; H04L 2209/76; H04L 2209/56; H04L 61/25; H04L 63/1475; H04L 63/1491; H04L 61/2539; H04L 63/20; H04L 63/0414; H04L 63/101; H04L 63/1458; H04L 63/0227
See application file for complete search history.

(56) References Cited

U.S. PATENT DOCUMENTS 6,141,755 A * 10/2000 Dowd et al. .................... 726/11
9,021,547 B1 * 4/2015 Lin et al. ........................ 726/1
2002/0166063 A1 * 11/2002 Lachman et al. ............. 713/200
2003/0103505 A1 * 6/2003 Hidaka et al. ................ 370/392
2003/0115344 A1 * 6/2003 Tang et al. .................... 709/229
2003/0126468 A1 * 7/2003 Markham ...................... 713/201
2004/0172557 A1 * 9/2004 Nakae et al. .................. 713/201
2005/0144133 A1 * 6/2005 Hoffman et al. ............... 705/50
2006/0053290 A1 * 3/2006 Randle et al. ................. 713/169
2006/0109850 A1 * 5/2006 Otani et al. ................ 370/395.2
2006/0123134 A1 * 6/2006 Munger et al. ............... 709/245
2006/0195896 A1 * 8/2006 Fulp et al. ....................... 726/11
2006/0285493 A1 * 12/2006 Manuja et al. ............... 370/235
2008/0040791 A1 * 2/2008 Munger et al. ................. 726/14

(Continued)

OTHER PUBLICATIONS

Department of Defense, USA. "Unified Capabilities Framework 2013," Section 1, (UC Framework 2013). 2013; 16 pages.*
Department of Defense, USA. "Unified Capabilities Framework 2013," Section 7, (UC Framework 2013). 2013; 42 pages.*

Primary Examiner — Don Zhao
(74) Attorney, Agent, or Firm — Johnson, Marcus & Isaacs, LLC (57) ABSTRACT Receive, at an access control node (ACN) of a first network enclave, a plurality of data packets inbound to the enclave. The characteristics of each received packet can be communicated from the ACN to a secure access server (SAS) of the enclave. The admissibility, to the first enclave, of each received packet for which characteristics are communicated, can be determined by the first secure access server. For each packet determined to be inadmissible, the technology can communicate, from the SAS to a plurality of ACNs of the first enclave, an instruction to deny admission to packets having the characteristics of the inadmissible packet. At each access control node receiving the instruction, the technology can deny admission to packets having the characteristics of the inadmissible packet based on the instruction to deny admission to packets having the characteristics of the inadmissible packet.

20 Claims, 8 Drawing Sheets

(56) References Cited

U.S. PATENT DOCUMENTS

| | | | |
|---|---|---|---|
| 2008/0216168 A1* | 9/2008 | Larson et al. | 726/15 |
| 2009/0083422 A1* | 3/2009 | McKay et al. | 709/225 |
| 2012/0042086 A1* | 2/2012 | Larson et al. | 709/228 |
| 2013/0139246 A1* | 5/2013 | Tryc et al. | 726/13 |
| 2014/0254406 A1* | 9/2014 | Anumala et al. | 370/252 |

* cited by examiner

210
Receive, at an access control node (ACN) of a first network enclave, data packets inbound to the enclave

220
Communicate characteristics of received packet from the ACN to an secure access server (SAS) of the enclave

230
Determine, in the SAS, admissibility to the enclave of each received packet for which characteristics are communicated using an access control list

440
Write, from the SAS, a deny statement to an access control list of each of the plurality of ACNs of the first network enclave

450
Deny, at each ACN to which the deny statement was written, admission to the first enclave in accordance with the access control list

FIG 8

COMPUTER NETWORK ACCESS CONTROL

TECHNICAL FIELD

The disclosed technology generally relates to controlling access to computer networks.

BACKGROUND

In computing, a denial-of-service (DoS) attack, and a distributed DoS (DDoS) attacks (each referred to hereinafter as "DoS" attacks), is an attempt to make a host or other network resource unavailable to its intended users. Although the motives, the targets, and the means to implement an attack may vary, a DoS attack typically consists of attempts to interrupt services of a host connected to a network, such as the Internet.

In an effort to mitigate the risk of such attacks, access control nodes (ACNs), such as routers may be interposed between an Internet point of presence (POP) and protected network hosts. Such ACNs may employ strategies, such as Access Control Lists (ACLs) to filter network traffic, and static routes to a Null0 interface to divert inadmissible network traffic.

For example, using an ACL, an access control node ACN, such as a router, may filter incoming network traffic by controlling whether routed packets are forwarded or blocked at the ACN's interfaces. The ACN examines a packet to determine whether to forward or drop the packet on the basis of the criteria specified within the ACL. ACL criteria may include the source address of the traffic, the destination address of the traffic, the upper-layer protocol, or other characteristics of the packet.

DESCRIPTION OF EXAMPLE EMBODIMENTS

Overview

The disclosed technology includes computer-implemented methods, computer program products, and apparatuses for computer network access control. In some embodiments, the technology can receive, at an access control node (ACN) of a first network enclave, a plurality of data packets inbound to the enclave. The characteristics of each received packet can be communicated from the ACN to a secure access server (SAS) of the enclave. The admissibility, to the first enclave, of each received packet for which characteristics are communicated, can be determined by the first secure access server. For each packet determined to be inadmissible, the technology can communicate, from the SAS to a plurality of ACNs of the first enclave, an instruction to deny admission to packets having the characteristics of the inadmissible packet. At each access control node receiving the instruction, the technology can deny admission to packets having the characteristics of the inadmissible packet based on the instruction to deny admission to packets having the characteristics of the inadmissible packet.

Description

Embodiments of the disclosed technology include computer-implemented methods, systems, and computer program products embodied in tangible media for control of network traffic into a protected network enclave. Example embodiments relate to mitigating the risk of DoS attacks.

Turning now to the drawings, in which like numerals represent like (but not necessarily identical) elements throughout the figures, example embodiments of the technology are described in detail.

Figure 1:
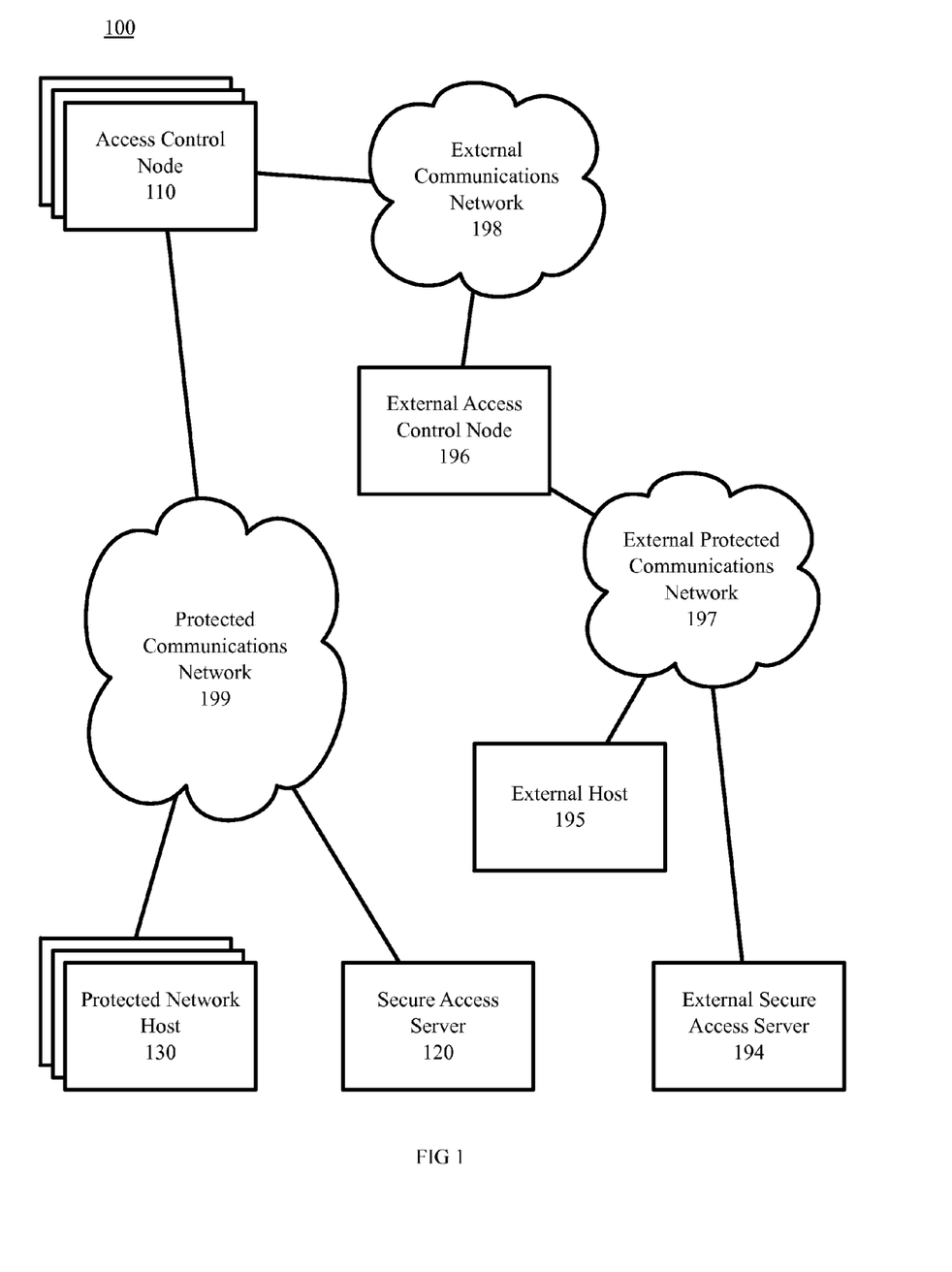
FIG. 1 is a block diagram of an architecture for computer network access control in accordance with certain example embodiments.

FIG. 1 is a block diagram of an architecture 100 for computer network access control in accordance with certain example embodiments. As depicted in FIG. 1, the architecture 100 includes network computing devices 110, 120, and 130, each of which may be configured to communicate with one another via protected communications network 199. In some embodiments, the architecture 100 also includes external communication network 198. The architecture provides connectivity to external nodes 194 and 195 on external protected communications network 197 through node 196. In some embodiments, a user associated with a device must install an application and/or make a feature selection to obtain the benefits of the techniques described herein.

Networks 199, 198, and 197 may include one or more wired or wireless telecommunications means by which network devices may exchange data. For example, each of networks 197, 198, and 199 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a Bluetooth® connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device can include a communication module capable of transmitting and receiving data over its connected network(s). For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device. In the example architecture depicted in FIG. 1, the network devices 110 and 120 may be operated by a network/system administration entity, and network devices 130 may be hosts (for example, personal computers) operated by end users.

The network connections illustrated are examples and other means of establishing a communications link between the computers and devices can be used. Additionally, those having ordinary skill in the art having the benefit of the present disclosure will appreciate that the network devices illustrated in FIG. 1 may have any of several other suitable computer system configurations. For example, a user device 130 embodied as a mobile phone or handheld computer may not include all the components described above.

The example methods illustrated in the following figures are described hereinafter with respect to the components of the example architecture 100. The example methods may also be performed with other systems and in architectures.

In such an architecture 100, Internet Protocol (IP) data packets (hereinafter "packets") from an external host 195 that are destined for a protected network host 130 are received at an access control node (ACN) 110 protecting one or more protected network hosts 130 of a protected network enclave. A protected network enclave can include the protected hosts 130, protected communications network 199, and the secure access server 120 as shown in FIG. 1. The ACN 110 reports characteristics of the packet, for example, the source IP address, to the secure access server (SAS) 120. The SAS can compare the characteristics to a master access control list (ACL) for the protected enclave to determine if such packets should be admitted to the protected network enclave. The master ACL can be stored on any storage device accessible to the SAS. Upon a determination by the SAS that a packet should not be admitted to the protected network enclave, the SAS 120 can write an entry to the ACL maintained on each ACN 110, not just the ACN 110 that received the packet, to deny entry to subsequent packets with the same characteristics. While the initial packet may be routed to the protected network host 130 indicated as the destination address in the packet, subsequent packets necessary to execute a DoS attack will not be delivered, thereby mitigating the risk of an effective DoS attack. In this way, each protected network host 130 covered by an ACN 110 with the newly written entry to its ACL is protected from attack by packets having characteristics described in the newly written entry.

While certain portions of the disclosed technology are described herein as being performed or caused by certain components of the example architecture, one of skill in the art of the technology will recognize that the technology can be implemented by allocating portions in other fashions.

Figure 2:
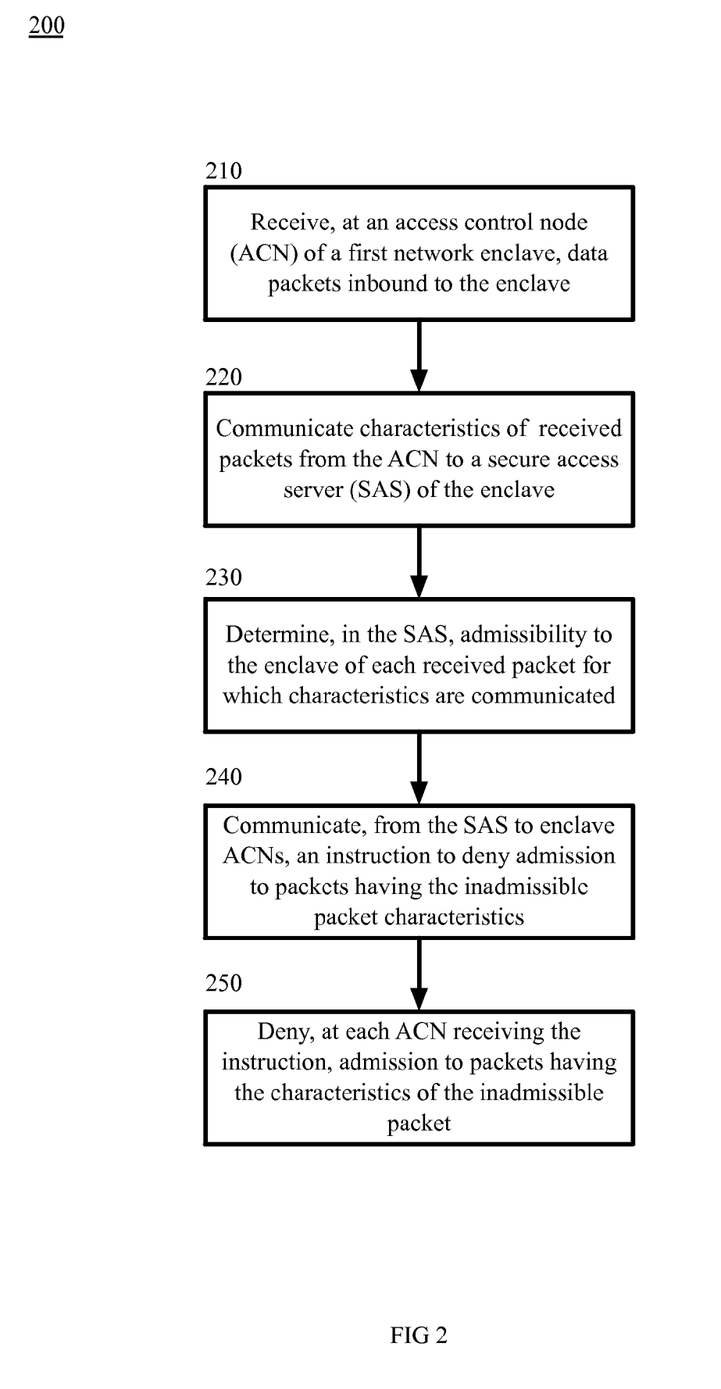
FIG. 2 is a block flow diagram depicting methods for computer network access control in accordance with certain example embodiments.

Referring to FIG. 2, and continuing to refer to FIG. 1 for context, methods 200 for computer network access control in accordance with certain example embodiments of the disclosed technology are illustrated. In such methods, packets inbound to a first network enclave can be received at a first access control node of the enclave—Block 210. As a continuing example, consider each of the packets of TABLE 1 received at a router serving as an ACN 110 at the edge of a first protected network enclave. While only source address and destination address are shown in TABLE 1 for ease of explanation, each packet can also specify the IP protocol, source and destination ports used in transport layer protocols such as Transmission Control Protocol (TCP) and User Datagram Protocol (UDP), among other packet characteristics.

TABLE 1

| PACKET # | SOURCE ADDRESS | DESTINATION ADDRESS |
|---|---|---|
| 1 | 192.0.2.110 | 201.0.4.220 |
| 2 | 180.9.2.120 | 201.0.4.210 |
| 3 | 170.56.9.130 | 201.0.4.230 |

Typically, an ACN, such as router, can compare characteristics, such as the source address, of each packet to entries in an ACL maintained in the router to determine if a packet should be admitted or refused admission to the protected network enclave. Over time, the number of ACL entries can grow to the point that network performance may be impacted. Once entered, ACL entries may remain on the router for a long period of time, even though packets from source addresses associated with an earlier DoS attempt are not encountered after the initial attack. Yet, the router will parse through each entry every time a packet is checked, causing a load on router processing resources that can impact network performance.

In the continuing example, the initial ACL includes only one active entry: access-list 1 deny host 192.168.10.1. As described in the following paragraphs and elsewhere herein, certain example embodiments of the disclosed technology allow a master ACL to be maintained in an SAS that serves multiple ACNs. Each ACN communicates characteristics of the packets it receives to the SAS. The SAS compares the packet characteristics to the master ACL and updates the ACL of each ACN as described elsewhere herein. In some embodiments, the SAS deletes ACL entries from ACN ACLs after a period of time so that the number of ACN ACL entries do not grow to the point of impeding ACN performance. This problem may be aggravated on smaller network devices that were not designed to handle large ACLs.

Characteristics of each packet received by the first ACN 110 can be communicated by the first ACN 110 to a first secure access server (SAS) 120 of the first network enclave—Block 220. In the continuing example, the router serving as an ACN 110 at the edge of the first protected network can execute a program, such as Cisco Netflow. Netflow is a network monitoring, network planning, network data collection, analysis, and reporting application. Using Netflow, the router can collect packet information, such as source and destination address, from the header of a packet. The collected information can be reported to the SAS 120. The SAS 120 can hold the incoming information in a cache for processing (for example, determining admissibility of packets having the communicated characteristics). In some embodiments, Netflow can be configured on the ACN 110 to export packet characteristics in real time to the SAS.

In the continuing example, the router maintains an ACL that includes ACL entries specifying certain source address groups from which packets are not admitted to the first protected network enclave. None of packet #1, packet #2, and packet #3 are from a source address denied admission to the first protected network enclave in the single-entry ACL maintained by the router. Each of packet #1, packet #2, and packet #3 are admitted to the protected network enclave.

Figure 3:
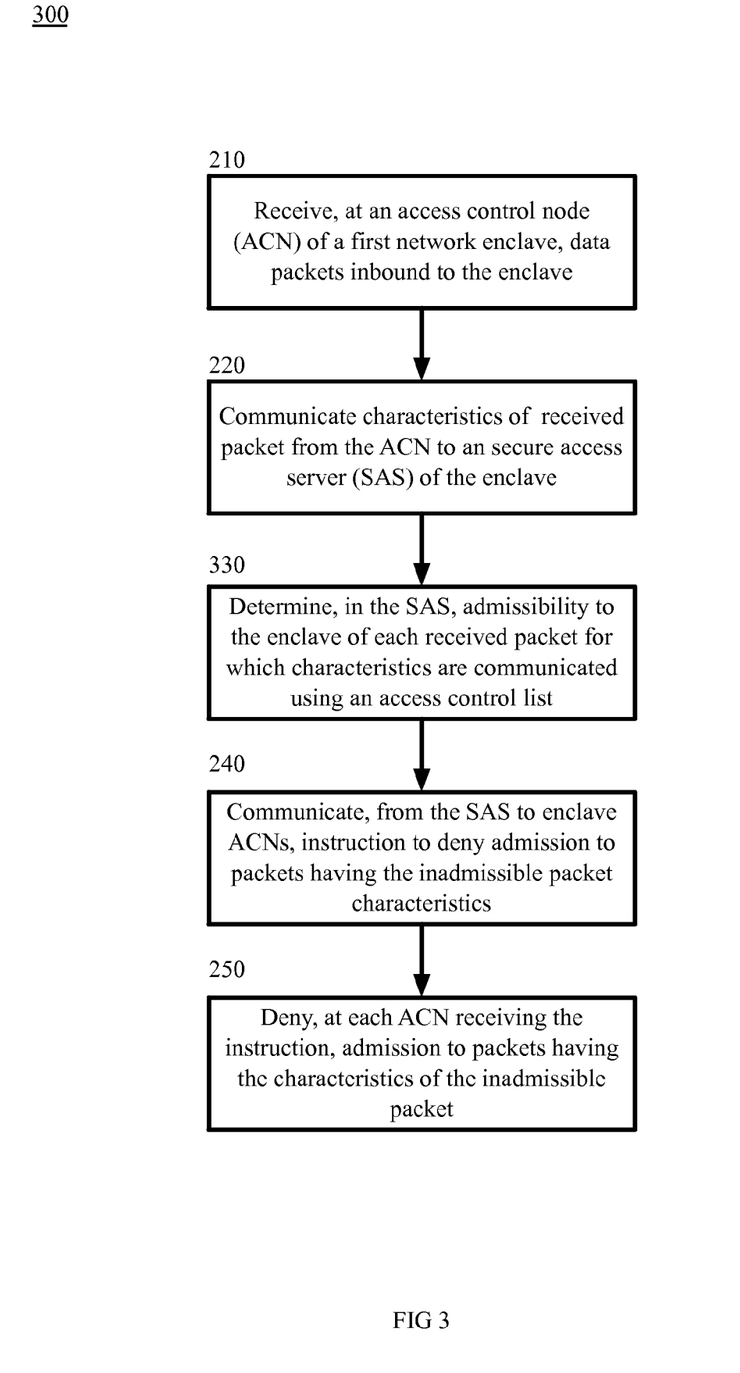
FIG. 3 is a block flow diagram depicting methods for computer network access control in accordance with certain example embodiments.

The admissibility to the network enclave of each received packet can be determined in the first ACN 120 using the packet characteristics received by the SAS 120 from the ACN 110—Block 230. Referring to FIG. 3 and continuing to refer to prior figures for context, methods 300 for computer network access control in accordance with certain example embodiments are presented. In such methods, Blocks 210, 220, 240, and 250 are performed as described elsewhere herein. In the continuing example, and in some methods such as 300, the SAS 120 maintains a master ACL with 20,000 entries for denying packets admission to the protected enclave. A portion of that master ACL is shown in TABLE 2. The master ACL includes entries for packet #1 and packet #2 from TABLE 1, but not packet #3. The master ACL can be used by the SAS to determine the admissibility to the protected enclave of each received packet for which characteristics have been communicated from an ACN—Block 330.

TABLE 2

| ACL DENY PACKET ID | SOURCE ADDRESS |
|---|---|
| 2,395 | 192.0.2.110 |
| 10,247 | 180.9.2.120 |

For each packet determined to be inadmissible to the first network enclave, certain example embodiments of the technology can communicate, from the first SAS to a plurality of ACNs, instructions to deny admission to the first network enclave to packets having the characteristics of the inadmissible packet—Block 240. This allows information gained by the first ACN (the receipt of an inadmissible packet) to be distributed to other ACNs in the protected enclave.

Figure 4:
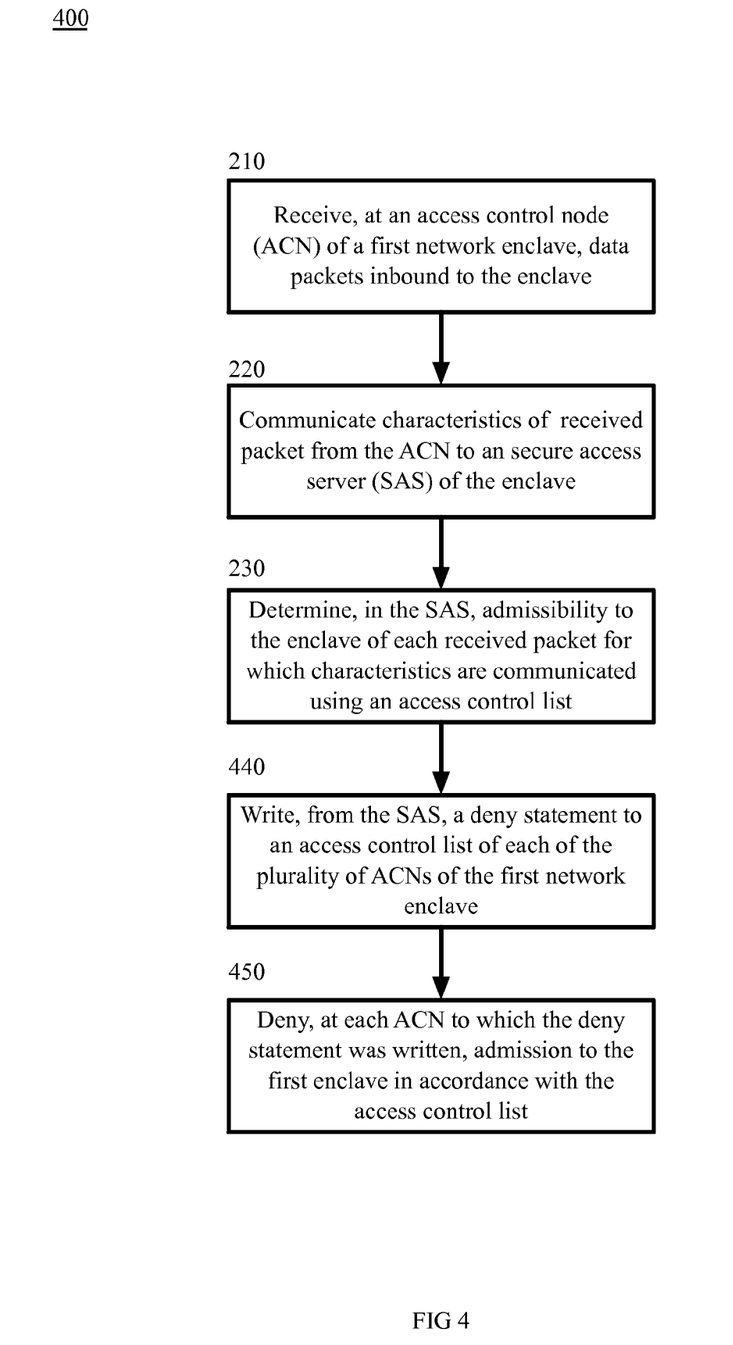
FIG. 4 is a block flow diagram depicting methods for computer network access control in accordance with certain example embodiments.

Referring to FIG. 4 and continuing to refer to prior figures for context, methods 400 for computer network access control in accordance with certain example embodiments are presented. In such methods, Blocks 210, 220, and 230, are performed as described elsewhere herein. In methods 400 illustrated in FIG. 4, the SAS 120 writes a deny statement with characteristics of packets determined to be inadmissible to the ACL of each ACN 110 for which that SAS 120 is responsible—Block 440. In the continuing example, the SAS 120 writes to deny statements to each of twenty (20) ACNs 110 for which it controls ACLs: access-list 2 deny host 192.0.2.110; and access-list 3 deny host 180.9.2.120. Note that while the master ACL maintained in the SAS 120 contains 20,000 entries, each ACN 110 in domain of the ACL contains only three (3) entries.

Returning to FIG. 2, each ACN 110 receiving the instruction from the SAS denies admission to the first network enclave to packets having the characteristics of the inadmissible packet—Block 250.

Returning to FIG. 4 each ACN 110 receiving the instruction denies admission in accordance with the ACL—Block 450. In the continuing example, each of the twenty (20) ACNs 110 controlled by the SAS 120 will deny admission to subsequent packets from source IP addresses 192.0.2.110 and 180.9.2.120 because of the ACL entries written by the SAS 120.

Figure 5:
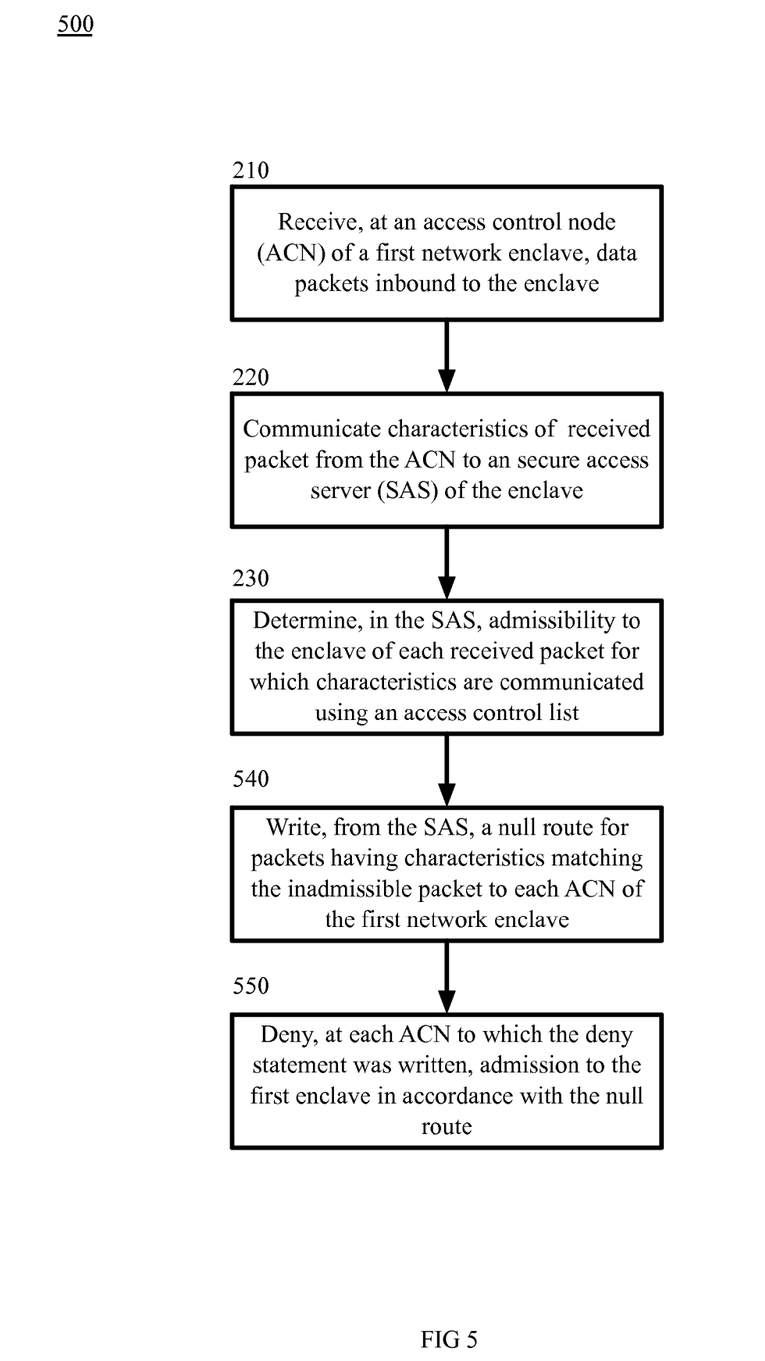
FIG. 5 is a block flow diagram depicting methods for computer network access control in accordance with certain example embodiments.

Referring to FIG. 5 and continuing to refer to prior figures for context, methods 500 for computer network access control in accordance with certain example embodiments are presented. In such methods, Blocks 210, 220, and 230 are performed as described elsewhere herein. Unlike as illustrated in FIG. 4, methods 500 of FIG. 5 employ a null route instead of an ACL entry at the ACN 110. Specifically, the SAS writes a null route with characteristics of packets determined to be inadmissible to the ACL of each ACN 110 for which that SAS 120 is responsible—Block 540. In the continuing example, the SAS writes a null route to each ACN for which it is responsible. Subsequently, each such ACN to which the deny statement was written, routes such packets in accordance with the null route—Block 550. In the continuing example, the twenty (20) routers under the control of the SAS route such packets to Null0, thereby preventing the packets from being communicated to the protected network hosts protected by those routers.

Figure 6:
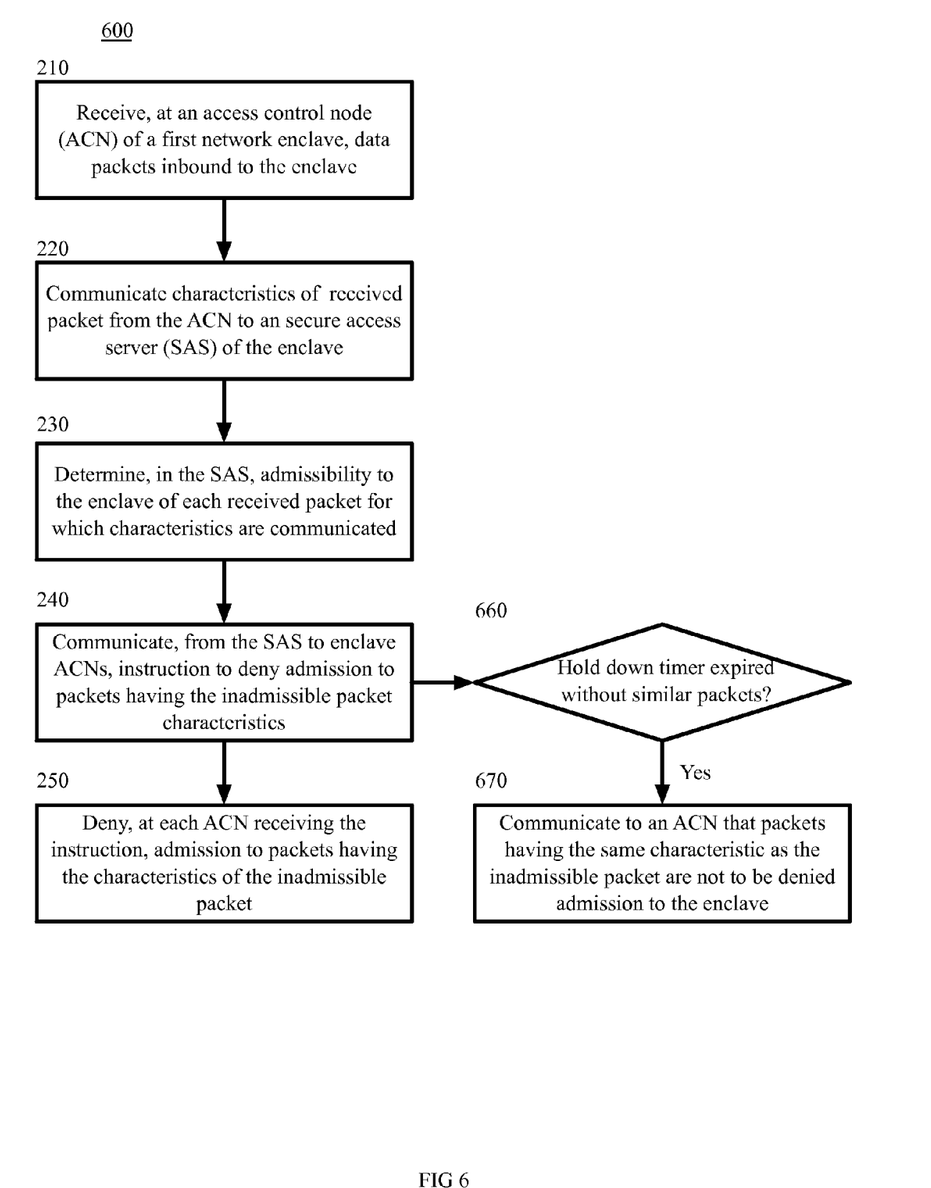
FIG. 6 is a block flow diagram depicting methods for computer network access control in accordance with certain example embodiments.

Referring to FIG. 6 and continuing to refer to prior figures for context, methods 600 for computer network access control in accordance with certain example embodiments are presented. In such methods, Blocks 210, 220, and 230 are performed as described elsewhere herein. In such embodiments, the SAS 120 tests for the absence of a communication regarding a packet having the same characteristics as inadmissible packets after a predetermined time from determining that a packet is inadmissible—Block 660—for example through the use of hold down timers. For example, the SAS 120 can use a predetermined fixed time for the hold down timer—for example, 1 hour, 12 hours, 1 day. The SAS can also use a random timer. In the continuing example, a random time from a predetermined distribution of times is used that results in one (1) minute for IP packets with IP source address 192.0.2.110, and three (3) minutes for packets from IP source address 180.9.2.120. This example has the benefit of increasing the difficulty of predicting when an ACN will begin admitting previously inadmissible packets.

Upon expiration of the timer, the SAS 120 communicates to ACNs 110 in its control that packets having the same characteristic as the inadmissible packet are not to be denied admission to the first network enclave—Block 670. Communication the revised ACL with the ACN can be accomplished by re-writing the ACL to the ACN through a telnet connection between the SAS and the ACN. In the continuing example, after one minute from determining that packets having the source address 192.0.2.110 are inadmissible, the SAS 120 re-writes the ACL for each ACN 110 under its control without the statement access-list 2 deny host 192.0.2.110. After three minutes from determining that packets having the source address 180.9.2.120 are inadmissible, the SAS 120 re-writes the ACL for each ACN 110 under its control without the statement access-list 3 deny host 180.9.2.120.

Figure 7:
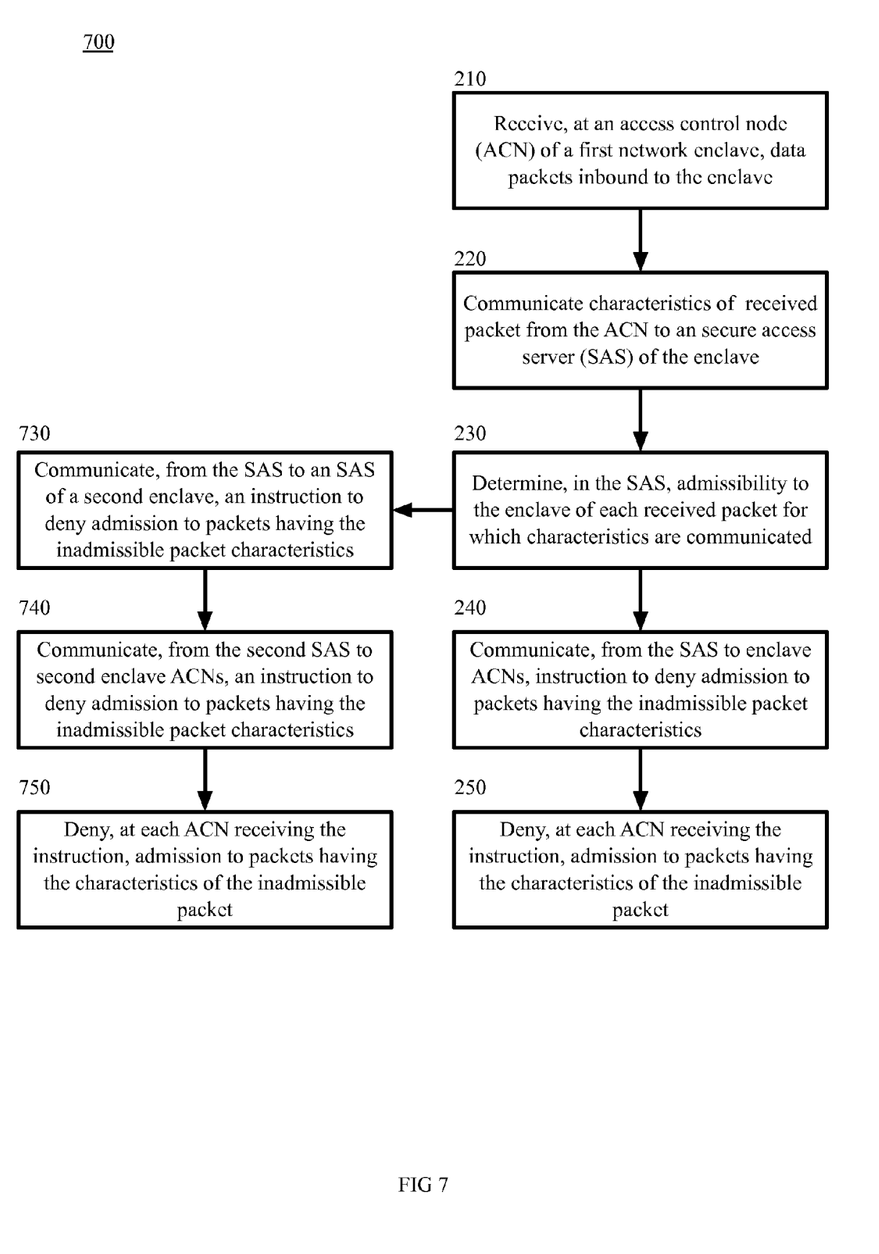
FIG. 7 is a block flow diagram depicting methods for computer network access control in accordance with certain example embodiments.

Referring to FIG. 7 and continuing to refer to prior figures for context, methods 700 for computer network access control in accordance with certain example embodiments are presented. In such methods, Blocks 210, 220, 230, 240, and 250 are performed as described elsewhere herein. In addition to the SAS 120 communicating to ACNs 110 of its own protected enclave that certain packets are to be denied admission to that protected enclave, the SAS 120 communicates to one or multiple SASs of other enclaves instructions to deny admission to packets having the characteristics of packets determined by the first SAS to be inadmissible—Block 730. This action allows external enclaves to benefit from information gained by the protected enclave. For example, consider an enterprise with multiple protected enclaves, having the SAS of each protected enclave in communication with the SASs of every other protected enclave of the enterprise. If a DoS attack were initiated against such an enterprise, then the initial packet recognized as inadmissible in one protected enclave would prompt other enclaves to deny admission to such packets, even if other such packets had not been received at an ACN of the other enclaves. While such an approach might be seen as potentially increasing the size of the ACL at each ACN of the enterprise, the use of hold down timers as described elsewhere herein will tend to keep each SAS ACL short, and containing only currently relevant entries. In some embodiments, each SAS in other enclaves instructs its own ACNs to deny admission in accordance with the access control policies of the particular enclave—for example, such packets will be denied entry if they are in the ACL of the other enclave, but will not be denied entry by the other enclave if they are not on the ACL of that enclave. In some embodiments, the receiving SAS can implement a protocol for handling recommendations to deny from a SAS of another enclave, for example to include prompting for operator input, or logging an reporting such messages. In the continuing example, the SAS 120 communicates to external SAS 194 to deny packets having a source address of each of the entries in TABLE 2.

The SAS 194 of the external enclave communicates to the ACNs under its control, such as external ACN 196 to deny entry to packets having characteristics of the inadmissible packets—Block 740. The external ACNs receiving this instruction, such as ACN 196, deny admission to the external protected network to such packets—Block 750.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

For example, while the SAS is referred to as singular for ease of explanation, multiple SASs (with mutually exclusive, or overlapping groups of ACNs) can be used in a single enclave. While the example embodiments above discussed the disclosed technology in the context of ingress traffic to an enclave, the technology can be applied to egress traffic as well. While a master ACL and null routes were used in the examples above, country blocks and a bogus IP address list (a "BOGONS" list) can be used in conjunction with the master ACL.

In some embodiments, each ACN exports received packet characteristics to the SAS in real time. The SAS checks the packet characteristics against the access control entries (including the master ACL) configured on the SAS. If the SAS discovers an unwanted access, the SAS logs the incident to a Syslog, checks a hold-down list that it has generated for previous intrusions, and if not found in the hold-down list, opens a session to the ACN and inserts an ACN ACL entry to block the unwanted traffic and updates its hold-down list on the SAS. If the traffic blocked is of the type of deny <ip> any any, the SAS can install a static route to null 0 for the route instead of installing an ACL entry. For entries added to the hold-down, a timer can be started and the timer can be restarted each time it sees an additional violation for the same record.

At this point, the SAS can send a message (for example, an SSL encrypted message using Cisco's Service Advertisement Framework (SAF)) that tells any other SAS (the SAS can know about each other via SAF configuration on the routers and servers) about the ACL entry to be blocked the other ACNs. These SASs also can add the entry to the ACL on their respective routers, and in the hold-down timers maintained by the ACL. The hold-down timer on each of the SASs can act independently.

Each SAS can open a session to their ACNs and insert the ACL entry or route to Null0. Each SAS can insert a record in the hold-down list for the unwanted access. If traffic with the same characteristics is not seen by the expiration of the hold-down time, then each of the SASs independently can pull the access list line from the ACN and/or delete the route to Null0. The hold down timers can be configurable and could be coded as time random to be less predictable by an outside entity.

By processing access control using an SAS, each individual ACN can be relieved of a portion of the tasks for access control. This approach also creates the ability to communicate an intrusion to other entities (enclaves) in an enterprise, and/or service provider network that unwanted traffic has been detected and securely communicate to any and all other ACNs to proactively block the traffic. The hold-down mechanism allows for ACLs and route tables that are dynamic and will expand or shrink the ACL's based on threat. This action can allow each ACN to perform its function more efficiently.

Embodiments of the technology can be used for initial access comparing permit lists to create an initial access list for permits to the network. Enterprises could implement this embodiment in conjunction with their service provider. If unwanted traffic occurs, a secure message is sent to the service provider to block this traffic at a higher level in the hierarchy. Embodiments of the technology do not sit in the data path and will not affect normal data flow.

Embodiments of the technology provide all the capabilities of an access list, and can examine data from any one or more of three layers of the Open Systems Interconnection (OSI) model, which are: the data link layer (mac-addresses), the network layer (IP Addresses), and the transport layer (ports and Protocols).

Figure 8:
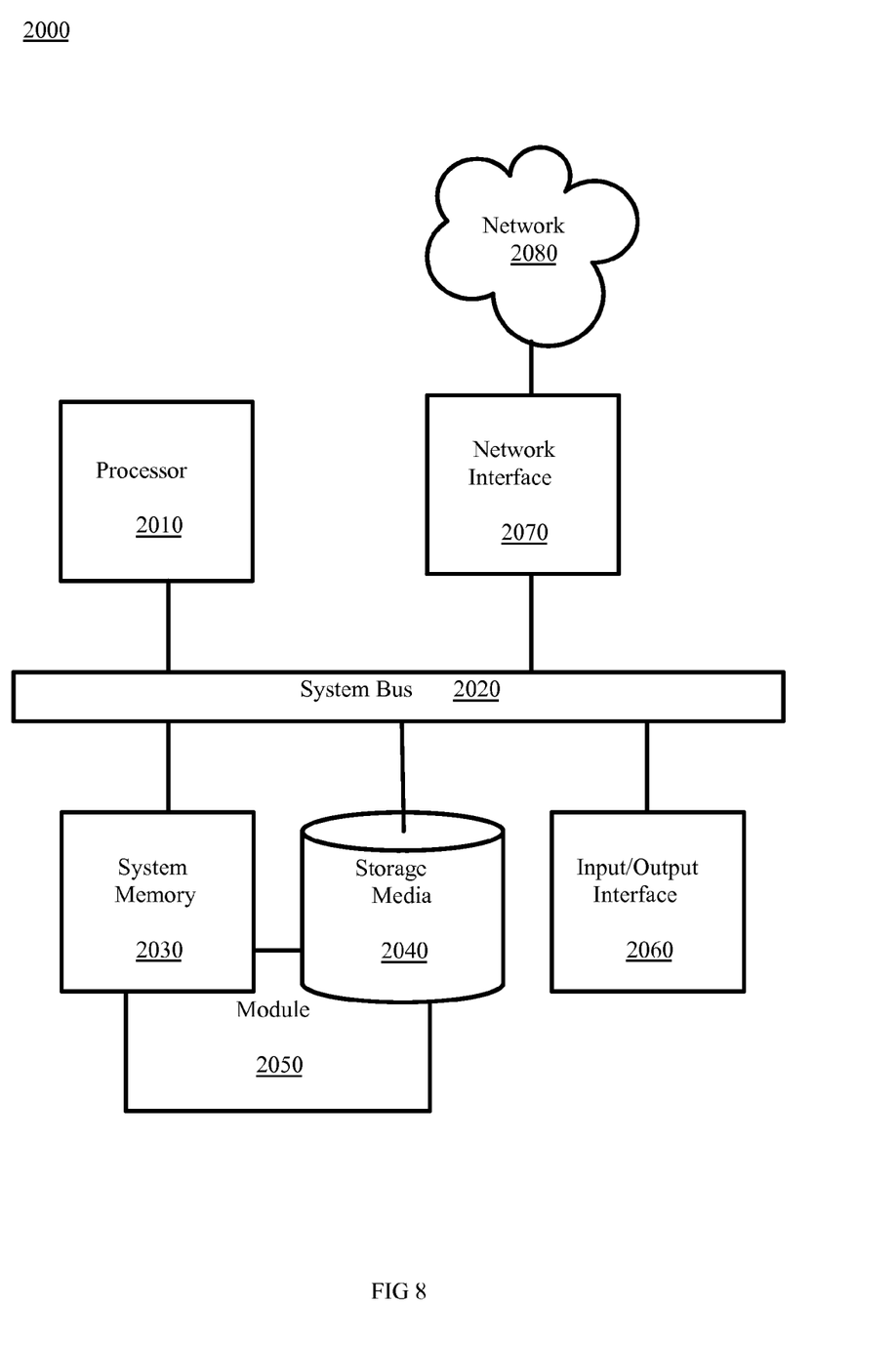
FIG. 8 illustrates a block diagram depicting a computing machine and a module, in accordance with certain example embodiments.

FIG. 8 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain example embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device, for example, a system on chip (SOC), system on package (SOP), or ASIC device.

In situations in which the technology discussed here collects personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained, (for example, to a city, ZIP code, or state level), so that a particular location of a user cannot be determined. Thus, the user may have control over how information is collected about the user and used by a content server.

Certain example embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing certain example embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Additionally, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the technology described herein. For example, certain example embodiments of the technology can be implemented on a single computing device (for example a user computing device), or in a cloud computing architecture.

We claim:

1. A method, comprising:
   receiving, at a first access control node of a plurality of access control nodes at a first packet-switched network enclave edge, a plurality of data packets inbound to the first network enclave;
   communicating characteristics of each received packet from the first access control node to a first secure access server of the first network enclave;
   determining, by the first secure access server, admissibility to the first packet-switched network enclave of each received packet for which characteristics are communicated, based at least in part on one or more of the communicated characteristics corresponding to each received packet;
   for each packet determined to be inadmissible to the first packet-switched network enclave, communicating, from the first secure access server to each of the plurality of access control nodes at the first packet-switched network enclave edge, a first instruction to deny admission to each packet having characteristics of the inadmissible packet.

2. The method of claim 1, further comprising:
   denying, at each access control node receiving the first instruction, admission to the first network enclave to each packet having the characteristics of the inadmissible packet based on the received first instruction.

3. The method of claim 1, further comprising, at the first secure access server:
   in absence of receiving a communication regarding a packet having the characteristics of the packet received at the first access control node and determined to be inadmissible to the first network enclave after a predetermined time from determining that the inadmissible packet is inadmissible, communicating from the first secure access server to at least one access control node of the first network enclave that each packet having the characteristics of the inadmissible packet is not to be denied admission to the first network enclave.

4. The method of claim 1, further comprising:
   for each packet determined to be inadmissible, communicating, from the first secure access server to a second secure access server of a second packet-switched network enclave, a second instruction to deny admission to the second network enclave to each packet having the characteristics of the inadmissible packet;
   communicating, from the second secure access server to a plurality of second access control nodes of the second network enclave, in response to the second instruction, a third instruction to deny admission to each packet having the characteristics of the inadmissible packet;
   denying, at each second access control node receiving the instruction, admission to the second network enclave to each packet having the characteristics of the inadmissible packet based on the third instruction.

5. The method of claim 1, wherein determining the admissibility to the first network enclave of each received packet for which characteristics are communicated comprises comparing the received characteristics to entries of an access control list.

6. The method of claim 1:
   wherein communicating, from the first secure access server to the each of the plurality of access control nodes of the first network enclave, the first instruction comprises writing a deny statement to an access control list of each of the plurality of access control nodes of the first network enclave; and wherein denying, at each access control node receiving the instruction, admission to the first network enclave to each packet having the characteristics of the inadmissible packet comprises denying admission to the first enclave in accordance with the access control list.

7. The method of claim 1:

wherein communicating, from the first secure access server to each of the plurality of access control nodes of the first network enclave, the first instruction comprises writing a null route for packets having characteristics matching the characteristics of the inadmissible packet to each of the plurality of access control nodes of the first network enclave, and wherein denying, at each access control node receiving the instruction, admission to the first network enclave to packets having the characteristics of the inadmissible packet comprises denying admission to the first enclave in accordance with the null route.

8. A tangible, non-transitory, computer-readable media having software encoded thereon, the software, when executed by a processor, configured to:

receive, by a first secure access server, characteristics of a data packet inbound to a first packet-switched network enclave and received at a first access control node of a plurality of access control nodes at an edge of the first network enclave;

determine, by the first secure access server, admissibility to the first network enclave of each received packet for which characteristics are communicated, based at least in part on one or more of the communicated characteristics corresponding to each received packet;

for each packet determined to be inadmissible to the first network enclave, communicate, from the first secure access server to each of a the plurality of access control nodes at the first network enclave edge, a first instruction to deny admission to each packet having characteristics of the inadmissible packet.

9. The tangible, non-transitory, computer-readable media of claim 8, further comprising:

denying, at each access control node receiving the instruction, admission to the first network enclave to packets having the characteristics of the inadmissible packet based on the received first instruction.

10. The tangible, non-transitory, computer-readable media of claim 8, wherein the software when executed by a processor is further configured to:

in absence of receiving a communication regarding a packet having the characteristics of the inadmissible packet received at the first access control node and determined to be inadmissible to the first network enclave after a predetermined time from determining that a packet is inadmissible, communicate from the first secure access server to at least one access control node of the first network enclave that packets having the same characteristic as the inadmissible packet are not to be denied admission to the first network enclave.

11. The tangible, non-transitory, computer-readable media of claim 8, wherein the software when executed by a processor is further configured to:

for each packet determined to be inadmissible, communicate, from the first secure access server to a second secure access server of a second packet-switched network enclave, a second instruction to deny admission to the second network enclave to packets having the characteristics of the inadmissible packet;

communicate, from the second secure access server to each of a plurality of second access control nodes of the second network enclave, in response to the second instruction, a third instruction to deny admission to packets having characteristics of the inadmissible packet;

deny, at each second access control node receiving the instruction, admission to the second network enclave to packets having the characteristics of the inadmissible packet based on the third instruction.

12. The tangible, non-transitory, computer-readable media of claim 8, wherein determining the admissibility to the first network enclave of each received packet for which characteristics are communicated comprises comparing the received characteristics to entries of an access control list.

13. The tangible, non-transitory, computer-readable media of claim 8:

wherein communicating, from the first secure access server to the plurality of access control nodes of the first network enclave, the first instruction comprises, writing a deny statement to an access control list of each of the plurality of access control nodes of the first network enclave; and wherein denying, at each access control node receiving the instruction, admission to the first network enclave to each packet having the characteristics of the inadmissible packet comprises denying admission to the first enclave in accordance with the access control list in accordance with an access control list of the second enclave.

14. The tangible, non-transitory, computer-readable media of claim 8:

wherein communicating, from the first secure access server to the plurality of access control nodes of the first network enclave, the first instruction comprises writing a null route for packets having characteristics matching characteristics of the inadmissible packet to each of the plurality of access control nodes of the first network enclave; and wherein denying, at each access control node receiving the instruction, admission to the first network enclave to each packet having the characteristics of the inadmissible packet comprises, denying admission to the first enclave in accordance with the null route.

15. An apparatus, comprising:

a processor operable to execute one or more processes; and a memory configured to store a process executable by the processor, the process when executed configured to:

receive, at a first access control node of a plurality of access control nodes at a first packet-switched network enclave edge, a plurality of data packets inbound to the first network enclave;

communicate characteristics of each received packet from the first access control node to a first secure access server of the first network enclave;

determine, by the first secure access server, admissibility to the first network enclave of each received packet for which characteristics are communicated, based at least in part on one or more of the communicated characteristics corresponding to each received packet; and for each packet determined to be inadmissible to the first network enclave, communicate, from the first secure access server to each of the plurality of access control nodes at the first network enclave edge, a first instruction to deny admission to each packet having characteristics of the inadmissible packet.

16. The apparatus of claim 15, further comprising:
denying, at each access control node receiving the instruction, admission to the first network enclave to packets having the characteristics of the inadmissible packet based on the received first instruction.

17. The apparatus of claim 15, wherein the process when executed is further configured to:
in absence of receiving a communication regarding a packet having the characteristics of the packet received at the first access control node and determined to be inadmissible to the first network enclave after a predetermined time from determining that a packet is inadmissible, communicate from the first secure access server to at least one access control node of the first network enclave that packets having the same characteristic as the inadmissible packet are not to be denied admission to the first network enclave.

18. The apparatus of claim 15, wherein the process when executed is further configured to:
for each packet determined to be inadmissible, communicate, from the first secure access server to a second secure access server of a second packet switched network enclave, a second instruction to deny admission to the second network enclave to packets having the characteristics of the inadmissible packet;
communicate, from the second secure access server to a plurality of second access control nodes of the second network enclave, in response to the second instruction, a third instruction to deny admission to packets having characteristics of the inadmissible packet;
deny, at each second access control node receiving the third instruction, admission to the second network enclave to packets having the characteristics of the inadmissible packet based on the received third instruction.

19. The apparatus of claim 15, wherein determining the admissibility to the first network enclave of each received packet for which characteristics are communicated comprises comparing the received characteristics to entries of an access control list.

20. The apparatus of claim 15:
wherein communicating, from the first secure access server to the plurality of access control nodes of the first network enclave, the first instruction comprises, writing a deny statement to an access control list of each of the plurality of access control nodes of the first network enclave; and
wherein denying, at each access control node receiving the instruction, admission to the first network enclave to each packet having the characteristics of the inadmissible packet comprises denying admission to the first enclave in accordance with the access control list.

* * * * *